United States Patent
Baldwin

(10) Patent No.: US 8,259,203 B2
(45) Date of Patent: Sep. 4, 2012

(54) METHOD AND APPARATUS FOR ACHIEVING PANCHROMATIC RESPONSE FROM A COLOR-MOSAIC IMAGER

(75) Inventor: Leo Baldwin, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 606 days.

(21) Appl. No.: 12/328,881

(22) Filed: Dec. 5, 2008

(65) Prior Publication Data

US 2009/0147112 A1 Jun. 11, 2009

Related U.S. Application Data

(60) Provisional application No. 60/992,643, filed on Dec. 5, 2007.

(51) Int. Cl.
*H04N 9/083* (2006.01)
*H04N 3/14* (2006.01)
*H04N 5/335* (2011.01)
*H04N 9/04* (2006.01)
*H04N 9/73* (2006.01)
*H04N 9/68* (2006.01)

(52) U.S. Cl. .............. 348/273; 348/223.1; 348/234; 348/294

(58) Field of Classification Search .............. 348/223.1, 348/273, 236, 294, 163, 169, 274–280, 234
See application file for complete search history.

(56) References Cited

U.S. PATENT DOCUMENTS

| 3,806,633 | A | 4/1974 | Coleman |
| 4,651,001 | A | 3/1987 | Harada et al. |
| 5,555,464 | A | 9/1996 | Hatlestad |
| 6,999,119 | B1* | 2/2006 | Shibazaki et al. ............ 348/273 |
| 7,235,775 | B2 | 6/2007 | Masaki |
| 2007/0070224 | A1* | 3/2007 | Sasaki ............................ 348/273 |
| 2007/0182836 | A1* | 8/2007 | Chino ........................... 348/273 |
| 2007/0183657 | A1* | 8/2007 | Kidono et al. ................ 382/162 |
| 2007/0211155 | A1 | 9/2007 | Numata |
| 2008/0218597 | A1* | 9/2008 | Cho ........................... 348/222.1 |

FOREIGN PATENT DOCUMENTS

| JP | 06-169461 | 6/1994 |
| JP | 2006-148690 A | 6/2006 |

* cited by examiner

*Primary Examiner* — Nhan T Tran
*Assistant Examiner* — Stephen Coleman
(74) *Attorney, Agent, or Firm* — Young Basile

(57) ABSTRACT

A method and apparatus for achieving monochromatic response from a low-cost color imager are presented. In this method and apparatus, the out-of-band response to infrared (IR) light by solid state sensors is exploited to produce a monochrome image. The monochrome image is produced by omitting the IR blocking filter from the sensor of the color imager and illuminating the scene to be imaged including IR radiation from an LED. The wavelength emitted from the LED is matched to the wavelength or wavelengths that correspond to a region where the sensor's response to IR light is relatively even, despite the color-mosaic filter permanently attached to the sensor.

15 Claims, 4 Drawing Sheets

METHOD AND APPARATUS FOR ACHIEVING PANCHROMATIC RESPONSE FROM A COLOR-MOSAIC IMAGER

CROSS-REFERENCE TO RELATED APPLICATION

This application claims priority to U.S. provisional application Ser. No. 60/992,643, filed Dec. 5, 2007.

FIELD OF THE DISCLOSURE

This invention relates to imaging systems, particularly those applied to machine vision systems. In particular it relates to use of color imagers in machine vision systems. More particularly it relates to the use of color imagers to create monochrome images for machine vision processing.

BACKGROUND

Traditionally, the market for focal-plane array solid state imagers, referred to in the art by their underlying technologies (i.e., CCDs for Charge Coupled Devices or CMOS for Complimentary Metal Oxide Semiconductors) has been driven by the market for video cameras, of which a CCD or CMOS sensor is a main component. Video cameras as used for studio broadcast, electronic news gathering (ENG) and consumer camcorders (where the video camera and tape deck or disk drive recorder are integrated into a single compact package) typically provide a color signal. This signal is typically generated by either of two methods.

The first method is typically applied to professional grade equipment and in the higher-grade of consumer equipment. For this method, the incoming image passes through a video lens and then passes through a dichroic prism cluster. The dichroic prism cluster is an assembly of three prisms, two of which have a dichroic (color-band selecting) coating. The first prism will have a surface that reflects one color band, typically blue, to a first CCD or similar imager, and passes the remainder of the colors. The second prism will have a surface that reflects a second color band, typically green, to a second CCD or similar imager. A third prism will accept the balance of the signal, in this case the red band, and transmit it to a third CCD or similar imager. If there is a coating on the third prism, it is typically a coating to reject out-of-band light to which the CCD may be sensitive but which is considered undesirable, for example infrared light. This coating to reject infrared (IR) light may alternatively be placed at the front of the prism cluster, be incorporated into a protective window or be incorporated into the lens. Note that in this first method, each of the CCDs or similar sensors are deployed with their full color spectral response intact as the color-separation is accomplished in the dichroic prism cluster. Furthermore, each of the sensors acquires image data at its full intrinsic resolution, yielding three full resolution images representing three colors from the scene imaged.

The second method is typically used in lower grade equipment such as lower cost and/or very compact ENG systems and in most consumer-grade camcorder systems. Here a single CCD or similar sensor is used. A color-mosaic filter is integrated with the solid state imager, whereby each picture element (pixel) of the imager array (i.e., the sensor) is covered by a corresponding color-band filter. FIG. 1 shows a diagram of a color-mosaic filter 10 showing exemplary red 12, green 14 and blue 16 color filter elements. Typically, one half of the pixels will be associated with a color-band filter that transmits primarily the green image component, one quarter of the pixels will be associated with a color band filter that transmits primarily the blue image component, and one quarter of the pixels will be associated with a color band filter that transmits primarily the red image component. This type of filter is sometimes referred to as a Bayer filter. This system is biased toward the green spectrum as a deliberate compromise to best satisfy the human observer. Humans are most sensitive to green light and less sensitive to blue and red light. The green component carries the most information regarding human faces to which humans are particularly sensitive. Note that in this method the color-mosaic filter is inseparable from the solid state imager, since the filter is aligned precisely with discreet photosensitive elements in the sensor during the manufacturing process and must remain aligned to perform properly. FIG. 2 shows a schematic diagram of a prior art solid state video sensor with attached color-mosaic filter, showing the sensor 20 with attached color-mosaic filter 22, optional IR blocking filter 24, optics assembly 26 and controller 30 attached to sensor 20 by cable 28.

Secondary industries including machine vision are relatively small users of video sensors and cameras compared to the broadcast, ENG and consumer camcorder industries. As a result, manufacturers typically do not manufacture sensors specifically for these secondary markets and therefore these applications must rely on sensors manufactured for other uses. Machine vision applications often require high speed processing and high sensitivity, high resolution and low cost sensors to be successful. For these reasons and others, machine vision applications typically use monochrome sensors, where image data from the scene imaged is rendered in shades of grey. To achieve monochrome imaging, machine vision applications sometimes use sensors developed for use in three-channel dichroic prism cluster professional equipment. This yields high speed processing since color information does not need to be processed, high sensitivity since the entire sensor is available to sense broad band illumination and high resolution since all of the picture elements or pixels are used. This is not, however, a low cost solution since these sensors typically cost much more than mass produced color-mosaic sensors.

Color-mosaic imagers are desirable to be used for machine vision applications because of their low cost. As a result of the permanently attached color filters, their sensors do not perform as well as monochrome sensors, typically requiring additional processing to eliminate color information, thereby forming a monochrome image. Since these cameras are designed to produce color information, the image data from the sensors is typically transmitted either as three separate (red, green and blue) images or encoded in one of the many color formats available. One result of this processing is to reduce resolution, since spatially separate red, green and blue pixels must be combined to form a single monochrome pixel, thereby reducing spatial resolution. In addition, the color filters reduce the sensitivity of each pixel, requiring longer exposure times and/or more light energy on the scene, neither of which is desirable.

The sensitivity of solid state imagers to IR is well known. Methods and apparatus for simultaneously imaging visible and infrared have been developed. For instance, U.S. Pat. No. 3,806,633, entitled Multispectral Data Sensor and Display System, discusses a dual sensor arrangement with optics to produce an IR image registered with a visible image. U.S. Pat. No. 4,651,001, entitled Visible Infrared Imaging Device with Stacked Cell Structure, seeks to produce simultaneous visible and IR images using a novel sensor architecture. The ability of solid state sensors to acquire both visible and IR data is exploited by U.S. Pat. No. 5,555,464, entitled Red/Near- Infrared Filtering for CCD Cameras, wherein a novel mosaic-color filter is used instead of the standard filter to admit IR light in addition to visible light. These approaches all produce color images in addition to IR images or produce false color images of IR data or IR and visible data combined, all of which tend to work against the machine vision goals of cheap, fast, high resolution processing.

There are now other major markets for CCD, CMOS and similar sensors, such as digital still cameras and cellular mobile phones that use color imagers of the color-mosaic filter type. These developments have led to the availability of sensors of much reduced cost that might be applied to machine vision systems and thereby reduce the cost of such systems. One system for using these low cost sensors to image IR data is shown in U.S. Pat. No. 7,235,775, entitled Infrared Imaging Apparatus for Processing Emissions in Infrared and Visible Spectrum. The system described therein removes the IR filter from the sensor, replacing it with a filter that passes only IR data. The system then relies on the visible light color-mosaic filter to form separate three peaks in the IR response and thereby form a false color image of three spectral bands in the IR wavelength region. This approach fails to address two of the major problems with using a color-mosaic filtered sensor to acquire IR data. First, the system must process three separate images, which is not an improvement over standard visible processing. Secondly, the three false color images acquired have reduced resolution with respect to the potential resolution of the sensor since they are spatially multiplexed.

Therefore it is evident that color-mosaic imagers have not been adaptable to the special requirements associated with machine vision due to the limitations mentioned above. Accordingly, there remains a need for reduced cost sensors that can be applied to machine vision applications by obtaining a panchromatic response from color-mosaic filtered solid state imagers.

BRIEF SUMMARY

The invention is a method of and apparatus for simulating panchromatic response from a multi-color imager. In one embodiment of the instant invention a set of spectral response curves depicting response of the multi-color imager as a function of wavelength is examined, identifying a region of said spectral response curves where the multi-color imager has a substantially uniform response to each wavelength. FIG. 3 is a graph 40 showing the spectral response of a typical color-mosaic filter. This graph shows the response in percent quantum efficiency of the blue 42, green 44 and red 46 filters as a function of wavelength. Note the uniform response of all three filters in the IR portion of the spectrum. This wavelength region is in the IR wavelength band, in the wavelengths from about 700 nm to 1000 nm and centered at about 850 nm. This wavelength region is typically blocked in commercially available cameras in order to prevent IR radiation from reaching the sensor and unfavorably affecting the image. An embodiment of the instant invention removes the conventional IR filter and optionally replaces it with a filter (also called an IR pass filter or a visible light filter) that blocks visible light and passes IR radiation. In the instant invention, a wavelength or wavelengths are selected from this wavelength region and an imaging scene to be imaged by the multi-color imager is illuminated with the selected wavelength(s) within the identified region, thereby acquiring IR data from the sensor that is related to the imaging scene. A schematic diagram of a system constructed according to the instant invention is shown in FIG. 4, which shows the sensor 50 with attached color-mosaic filter 52, optional IR pass filter 54, optical assembly 56, cable 58 connecting the sensor 50 to the controller 60 along with the illumination source 62 with its cable 64 operatively connecting the illumination source 62 to the controller 60.

DETAILED DESCRIPTION OF THE PREFERRED EMBODIMENTS

Figure 1:
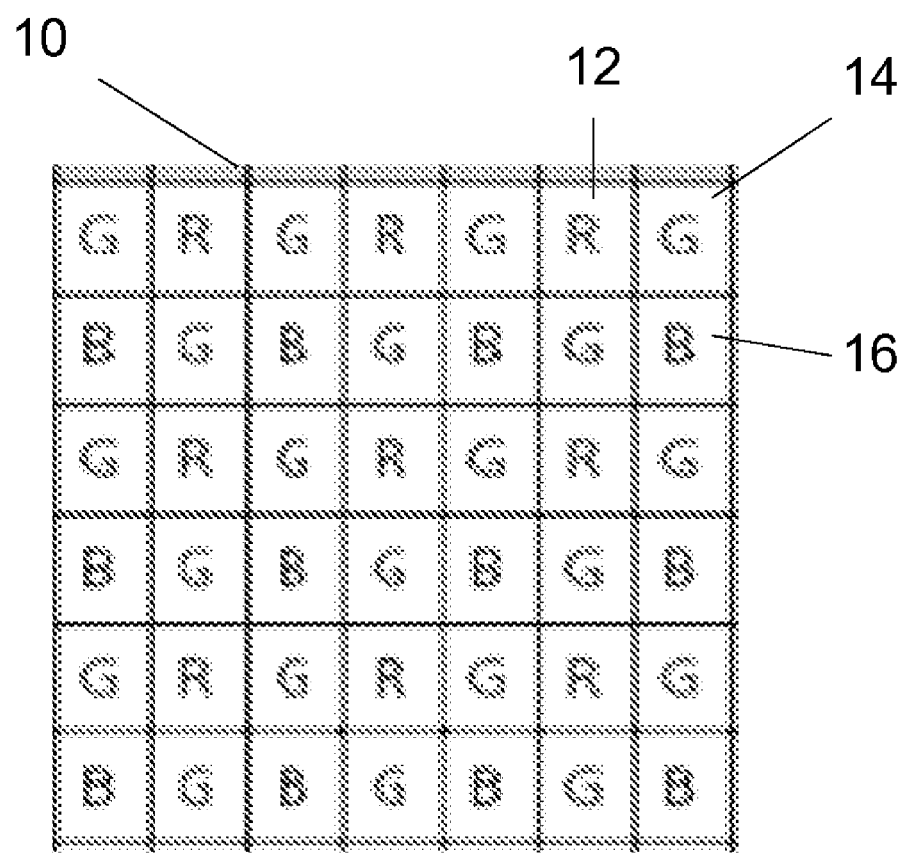
FIG. 1 is a schematic diagram of a prior art mosaic filter.

FIG. 1 shows standard Bayer tiling for the color-mosaic filter 10 that is aligned with a CCD or CMOS solid state sensor. Exemplary red 12, green 14 and blue 16 filter elements are indicated. Proper application of this type of filter to a solid state imaging sensor requires that the each color section of the filter be aligned with a single active picture element in the sensor. This is so that each sensor element or pixel will be exposed to only one filtered color. This requires that the filter be carefully aligned and permanently attached to the sensor. By analysis of the diagram, it is apparent that for an image formed with the aid of a green illuminant the image will be formed with essentially one half of the resolution of the equivalent panchromatic sensor, and for blue or red illuminants the resulting image will be one quarter the resolution of the equivalent panchromatic imager.

For machine vision, it is common practice to control the illuminator for optimal geometry of the light and for timing of the light (stroboscopic or flash applications). The most practical illuminator for these applications is often light emitting diode (LED) lighting, which is typically quasi-monochromatic spanning only a few nanometers in wavelength. Although white LEDs are available in at least two different technologies (tri-stimulus and secondary emission types), neither technology is available in the variety of package types and styles of the more established single-color LEDs. Furthermore, even if suitable broadband illumination is available, it is often the form of the object and not the color of the object that is under study, and if color information is present (such as by the use of a color imager and a broad-band illuminator), it may present spurious information that must be computationally filtered out or ignored.

Figure 2:
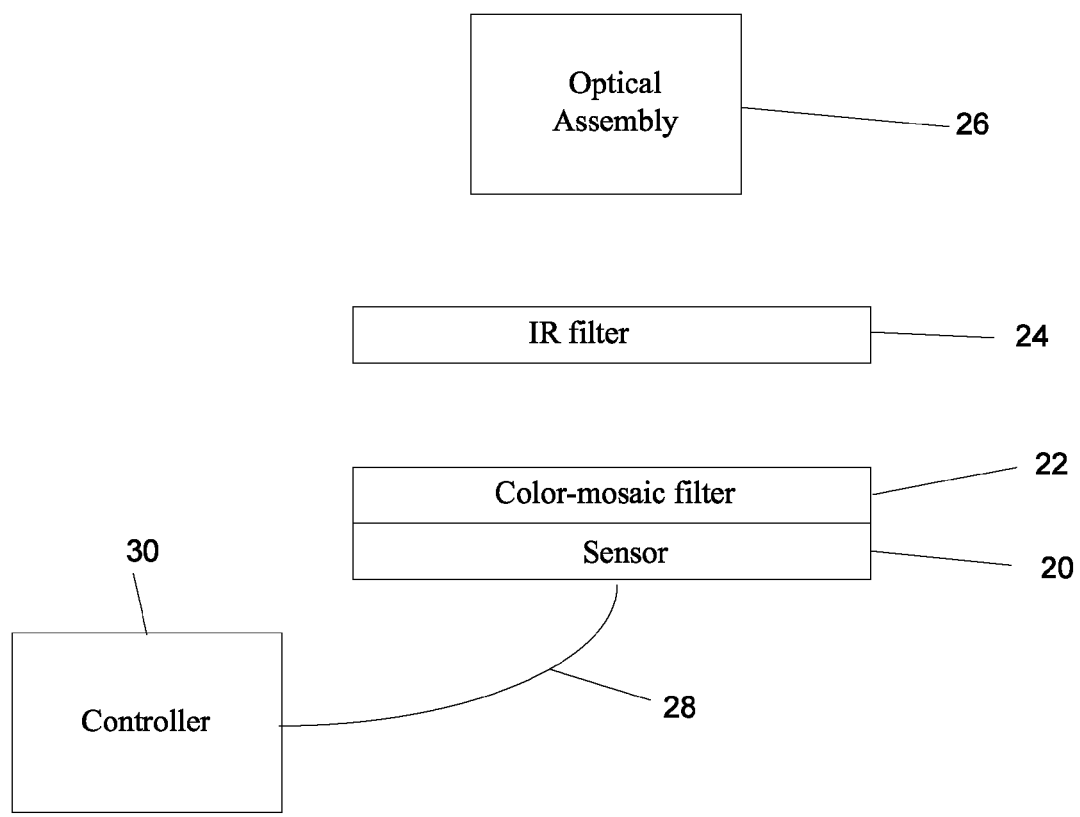
FIG. 2 is a schematic diagram of a prior art color-mosaic solid state camera.

FIG. 2 shows a typical prior art color-mosaic solid state video system including a solid state sensor 20 with attached color-mosaic filter 22. Light enters the system through the optical assembly 26, passes through an optional IR filter 24 to block IR light from reaching the sensor, and then passes through the color-mosaic filter 22 to the solid state sensor 20. Image data formed by the sensor 20 is transmitted via cable 28 to controller 30 for processing. Most but not all color-mosaic imagers contain IR filter 24. The purpose of the IR filter 24 is to filter out extraneous information coming from IR radiation in the scene that would distort the color response of the imager. For most commercial applications, the goal is accurate color fidelity as opposed to maximum sensitivity or resolution. Since the IR filter 24 does not require permanent precise alignment, it is typically either attached to the outer surface of the sensor 20 on top of the color-mosaic filter 22 or is included in optical assembly 26. Regardless of where it is found in the system, it is usually possible to remove the IR filter 24 and replace it with another type of filter as described herein.

Figure 3:
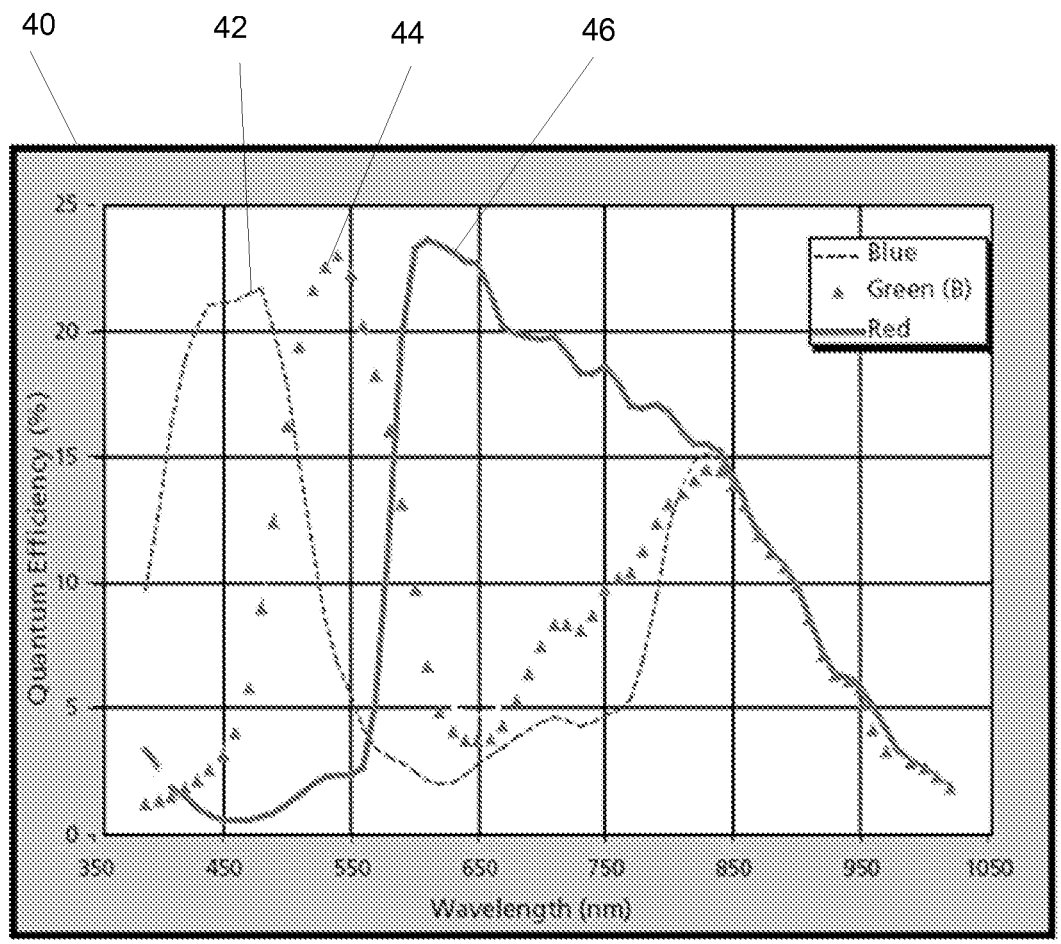
FIG. 3 is a graph showing the spectral response of three colors of a mosaic filter.

FIG. 3 is a graph 40 showing the spectral response of a typical color-mosaic filter. This graph shows the response in percent quantum efficiency of the blue 42, green 44 and red 46 filters as a function of wavelength. What can be seen by analysis of this graph is that all of the bands have "leakage" in the infrared region. Typically, this leakage is addressed with an optical filter that rejects this "out-of-band" radiation. However, the instant invention exploits this leakage. In a preferred embodiment, an illuminator is chosen at the point of highest and most nearly matched responsivity. This matched responsivity typically occurs between 700 nm and 1000 nm. In one embodiment of the instant invention, illumination at 850 nm will result in substantially panchromatic response. It also happens that this color is a common LED type and is readily available in a wide variety of packages and sizes. Such devices are typically based on the semiconductor material Aluminum Gallium Arsenide, which has a band gap that corresponds to emission at or near 850 nm.

Figure 4:
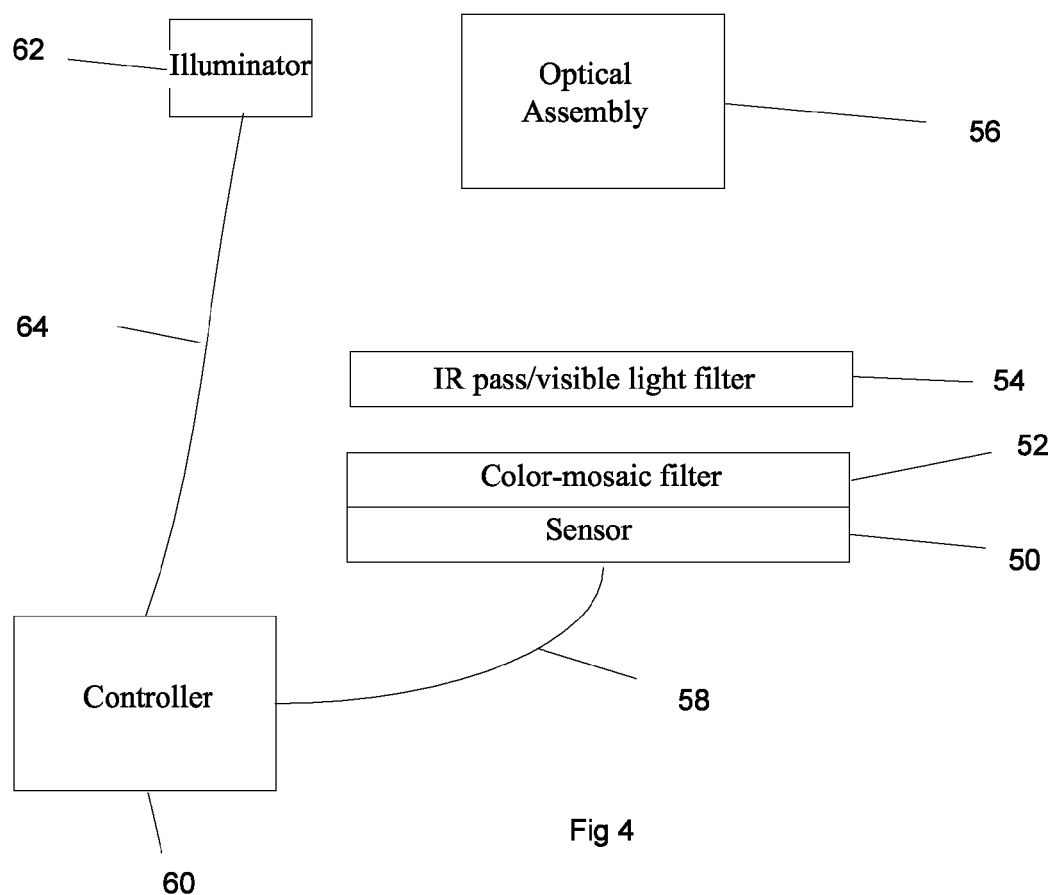
FIG. 4 is a schematic diagram of a monochrome machine vision system using a color-mosaic filtered sensor.

FIG. 4 shows a system constructed according to the instant invention. An embodiment of this invention uses a commercially available color-mosaic imager or a camera based on the same with color-mosaic filter 52 attached to the sensor 50 of the imager or camera. Near panchromatic response is achieved with said imager or camera by removing the IR-blocking filter and optionally replacing it with a filter 54 that passes IR radiation in the selected wavelengths and blocks visible light. In a preferred embodiment, a quasi-monochromatic illumination source, or illuminator, 62 of a particular wavelength range is used, specifically that wavelength range that corresponds to the spectral response of the imager where all three color channels are substantially equal or a subset thereof. In this case the wavelength range is between 700 and 1000 nm. In particular, a wavelength of about 850 nm can be used. In a preferred embodiment, a quasi-monochromatic illuminator 62 is selected at the relative peak of responsivity within the range where response to all three color channels is substantially equal. The illuminator 62, under control of and connected to a controller 60 via a cable 64, illuminates the scene (not shown) at the appropriate time and with the selected wavelength or wavelengths. The scene is imaged via an optical assembly 56 that comprises a lens or lenses operative to focus IR radiation emitted by illuminator 62 and reflected by the scene and imaged onto the sensor 50 through the color-mosaic filter 52 and the optional IR pass filter 54. The image data thusly acquired by the sensor 50 is transmitted via cable 58 to controller 60 for further processing.

In an embodiment of the instant invention, the initial processing of controller 60 involves forming a single monochromatic image from three pseudo-color images transmitted by the sensor 50 to the controller 60. Note that color information can be encoded in a variety of ways. The simplest is RGB format where three separate images with reduced resolution comparable to their reduced sampling of the sensor area are transmitted. Other encodings such as YUV or NTSC are possible and would work with this method, albeit with possible reduced spatial resolution or dynamic range. This initial processing creates a monochrome image by filling in a two-dimensional (2D) array with dimensions same as the original full size sensor with data from the three pseudo-color images. The data from the "red", "blue" and "green" images are placed into the monochrome image array according to where the particular pixel was acquired from on the original sensor 50, thereby creating a monochrome image with the same intrinsic resolution as the original sensor 50. Furthermore, since the scene was illuminated with IR light that is selected to be equally transmitted by all three colors in this embodiment, the sensitivity of the system to light is maximized.

Another embodiment of this invention further processes the data to remove any variances in response by the color-mosaic imager to the filtered IR data. It is conceivable that different colors in the color-mosaic filter/sensor combination might respond differently to IR radiation. Since the instant invention depends upon having uniform response from the sensor 50 regardless of the filter, this difference in response can be eliminated by measuring the response over the dynamic range of the sensor 50 with the wavelength of IR light selected and calculating correction factors based on the response. These factors can be additive or multiplicative and are applied to each pixel by the controller 60 depending upon which color filter it was acquired through in order to eliminate or reduce the variance in response between the various colors of the color-mosaic filter.

It will be apparent to those of ordinary skill in the art that many changes may be made to the details of the above-described embodiments of this invention without departing from the underlying principles thereof. The scope of the present invention should, therefore, be determined only by the following claims.

What is claimed is:

1. An improved method of simulating panchromatic response from a multi-color imager including a sensor and a multi-color filter, said multicolor imager operative to image an imaging scene and to thereby acquire image data, the improvement comprising:
    identifying a region of spectral response curves where said multi-color imager has a substantially uniform response to a plurality of wavelengths;
    illuminating said imaging scene with an illumination source emitting light having a wavelength within said substantially uniform response region;
    imaging said imaging scene to acquire said image data from said multi-color imager while illuminating said imaging scene, wherein said image data includes a pseudo color image associated with a respective color of the multi-color filter; and
    combining, using a controller, said image data into a single monochrome image with a same intrinsic resolution as the sensor, thereby simulating panchromatic response from the multi-color imager, by filling in a two-dimensional array with dimensions same as the sensor with pixel data from each pseudo color image according to where the pixel data was acquired from on the sensor.

2. The method of claim 1, further comprising:
    determining a difference in response, of said image data over said substantially uniform response region; and
    applying a correction to the image data based on said determined difference.

3. The method of claim 1 wherein said multi-color filter is a Bayer filter having only red, green and blue filter components.

4. The method of claim 1 wherein imaging said imaging scene comprises:
    imaging said imaging scene using said multi-color imager in an absence of an infrared filter.

5. An improved method of simulating panchromatic response from a multi-color imager including a sensor and a multi-color filter, said multicolor imager operative to image an imaging scene and to thereby acquire image data, the improvement comprising:

identifying a region of spectral response curves where said multi-color imager has a substantially uniform response to a plurality of wavelengths;

illuminating said imaging scene with an illumination source emitting light having a wavelength within said substantially uniform response region;

imaging said imaging scene to acquire said image data from said multi-color imager while illuminating said imaging scene; and transmitting said image data to a controller that combines said image data into a single monochrome image with a same intrinsic resolution as the sensor, thereby simulating panchromatic response from the multi-color imager, wherein imaging said imaging scene comprises:

imaging said imaging scene using said multi-color imager in an absence of an infrared filter and through a visible light filter aligned with said multi-color imager, said visible light filter blocking visible light.

6. The method of claim 1 wherein said wavelength emitted by said illumination source is between about 700 nm to 1000 nm.

7. The method of claim 1 wherein said wavelength emitted by said illumination source is about 850 nm.

8. An improved apparatus for simulating panchromatic response from a multi-color imager including a sensor and a multi-color filter, said multi-color imager operative to image an imaging scene and to thereby acquire image data, the improvement comprising:

an illumination source; and a controller that identifies a region of spectral response curves where said multi-color imager has a substantially uniform response to a plurality of wavelengths, controls the illumination source to illuminate said imaging scene using light having a wavelength within said substantially uniform response region, controls said multi-color imager to image said imaging scene while said illumination source illuminates said imaging scene to acquire said image data, said image data including a pseudo color image associated with a respective color of the multi-color filter and combines said image data into a single monochrome image with a same intrinsic resolution as the sensor by filling in a two-dimensional array with dimensions same as the sensor with pixel data from each pseudo color image according to where the pixel data was acquired from on the sensor, thereby simulating panchromatic response from the multi-color imager.

9. The apparatus of claim 8 wherein said multi-color filter is a Bayer filter having only red, green and blue filter components.

10. The apparatus of claim 8 further comprising:

a visible light filter aligned with said multi-color imager, said visible light filter blocking visible light.

11. The apparatus of claim 8 wherein said wavelength emitted by said illumination source is between about 700 nm and 1000 nm.

12. The apparatus of claim 8 wherein said wavelength emitted by said illumination source is about 850 nm.

13. The method of claim 1 wherein the illumination source is a quasi-monochromatic illumination source.

14. The method of claim 5 wherein the illumination source is a quasi-monochromatic illumination source.

15. The apparatus of claim 8 wherein the illumination source is a quasi-monochromatic illumination source.

* * * * *